Jan. 28, 1969 P. C. TABOR 3,424,492
SEAT BACK ADJUSTER LINK
Filed Sept. 18, 1967 Sheet 1 of 2
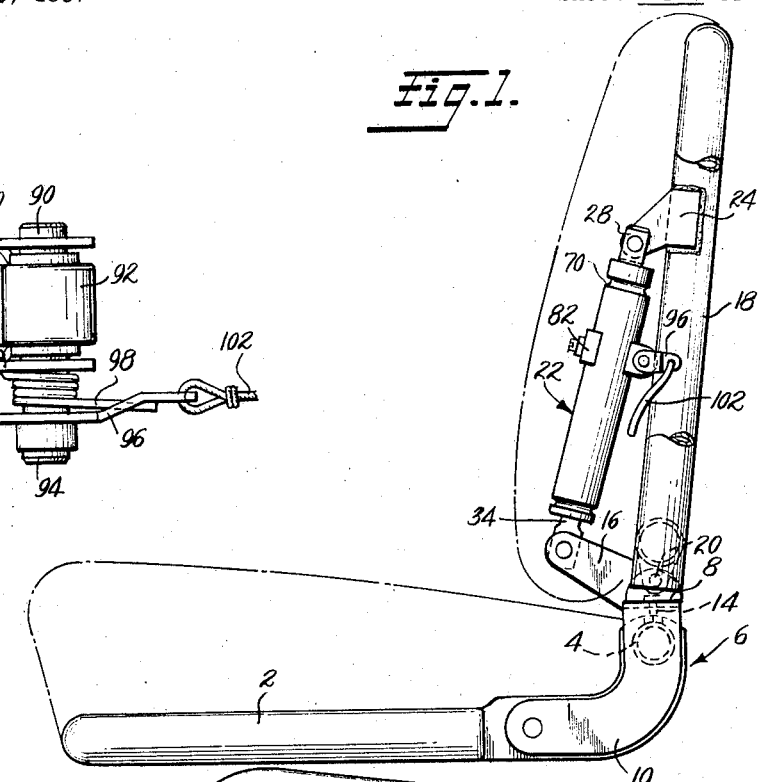
INVENTOR.
PAUL C. TABOR
BY Bacon & Thomas
ATTORNEYS

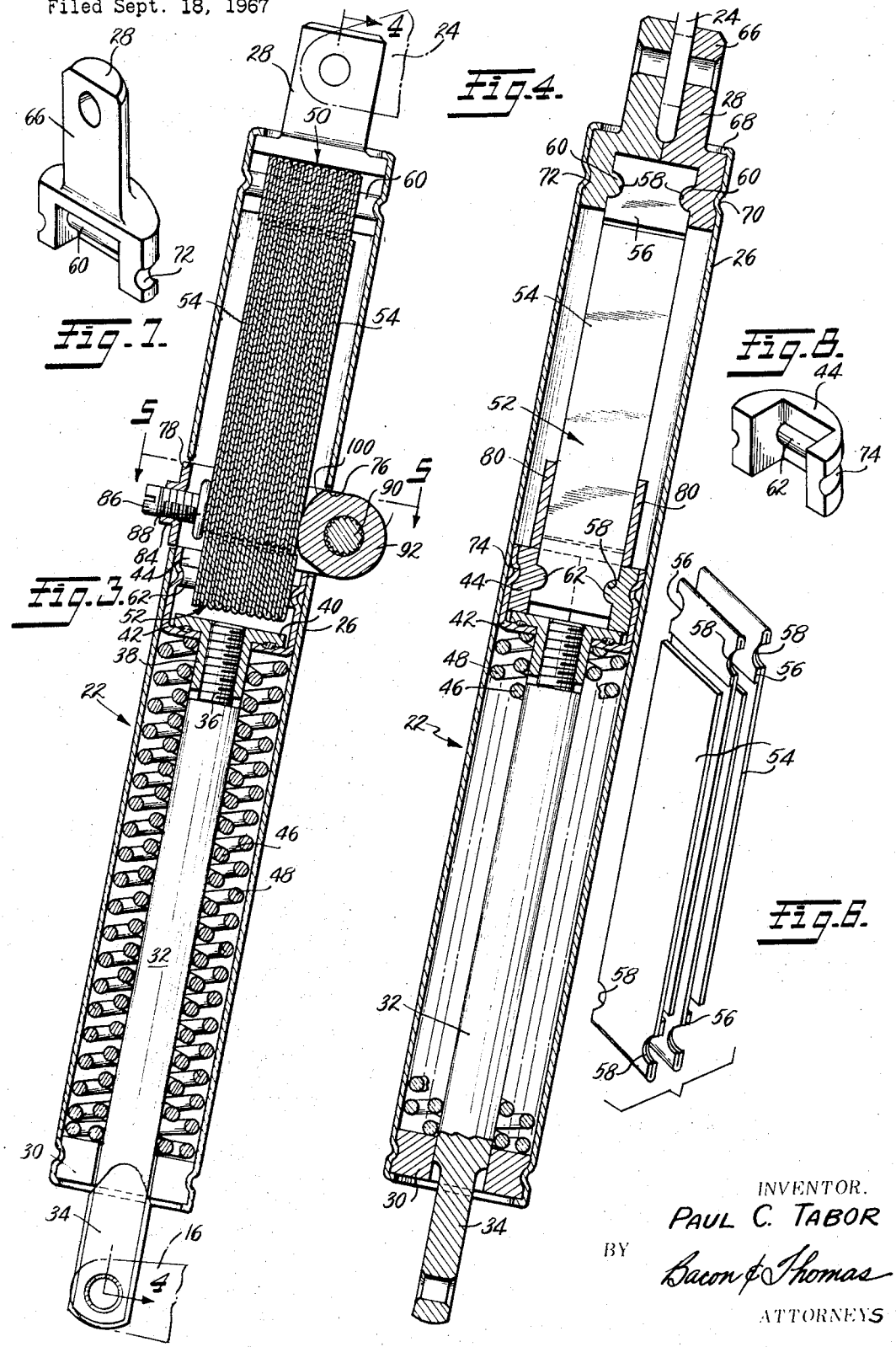

United States Patent Office 3,424,492
Patented Jan. 28, 1969

3,424,492
SEAT BACK ADJUSTER LINK
Paul C. Tabor, Clawson, Mich., assignor to Meteor Research Limited, Roseville, Mich., a partnership between Wally H. Kozlowske and Paul C. Tabor
Filed Sept. 18, 1967, Ser. No. 668,331
U.S. Cl. 297—361          7 Claims
Int. Cl. B60m 1/02; A47c 3/00

ABSTRACT OF THE DISCLOSURE

An extensible and contractible link one portion of which is tubular and the other being telescopically slidable therein, spring means between the portions normally urge the link to contract. A plurality of friction plates is fixed to each portion of the link within the tube and extend longitudinally toward the other portion in interleaved frictional relation with the corresponding plates on that other portion. A selectively releasable spring biased cam and an opposing abutment apply clamping pressure to the interleaved stack of plates to frictionally lock the link in any selected position of adjustment.

Background of the invention

This invention is in the field of adjustable links, particularly those employed for effecting adjustment of a tiltable seat back.

Position adjusters are well known and are widely employed for reclining seat backs in automobiles, buses, and the like. The majority of the heretofore available position adjusters are equipped with ratchet and pawl mechanisms which provide a limited number of adjusted positions depending upon the number and spacing of the teeth on the ratchet. Such position adjusters, in addition to having only a small number of adjusted positions, which cannot be altered by the user, are noisy and subject to rapid wear. A need has therefore long existed for position adjusters having a wider range of adjustment, quieter operation, and a longer service life.

One attempt to satisfy this need entails the use of a hydraulic piston and cylinder arrangement which has proved too expensive to be commercialy feasible particularly because of requirements for preventing leakage of the hydraulic fluid. Other proposals, including extensible rod arrangements which are selectively locked or released by movement of a tiltable washer construction have in general lacked the necessary compactness, lightweight, dependability and low cost which are necessary to satisfy the requirements of commercially practical applications.

Summary of the invention

The present invention is directed to an adjustable link structure having means whereby its opposite ends can be attached to devices to be adjusted relative to each other and which link is of adjustable length, one portion being longitudinally movable relative to another portion. Both portions are provided with a plurality of friction plates extending toward the other portion and which plates are interleaved and in frictional contact. A selectively releasable clamp means applies pressure across the stacked plates to hold them against relative movement and thus hold the link portions in the selected position of adjustment. The pressure is applied by a spring-pressed rotary cam bearing against a movable plate whereby the link may be forcibly adjusted in one direction but not in the other.

In its preferred embodiment, the novel adjustable link provided by the present invention includes a tubular housing, an extensible tension member mounted in and protruding from the housing, and a plurality of friction plates mounted to the tubular housing and interlocked alternately with the same number of plates attached to the extensible tension member. A lever operated cam applies a load through the friction plates causing the extensible tension member to be locked relative to the tubular housing. The lever operated cam may be rotated from the normal lock position about a fulcrum pin thereby removing the force causing a frictional lock allowing the tension member freedom of movement relative to the tubular housing.

The housing and tension member may be attached to the seat portion and seat back of the seat with which the position adjuster is employed. Consequently, by varying the extension of the tension member from the housing in the manner described above, the seat back may be positioned in any one of an infinite number of positions relative to the seat portion within a wide range of adjustment. Moreover, the present position adjuster operates noiselessly.

Brief description of the drawings

FIG. 1 is a side elevational view of the seat adjuster of the present invention showing its relation to the back of a seat;

FIG. 2 is a perspective view of the seat adjuster and the seat frame of FIG. 1;

FIG. 3 is an enlarged vertical, sectional view through the seat adjuster taken on the line 3—3 of FIG. 2;

FIG. 4 is a vertical sectional view taken on the line 4—4 of FIG. 3;

FIG. 5 is a horizontal sectional view taken on the line 5—5 of FIG. 3;

FIG. 6 is an exploded perspective view showing the relationship of the friction plates;

FIG. 7 is a perspective view of one of the elements of the clevis connector; and FIG. 8 is a perspective view of one of the elements of the actuator guide.

Description of a preferred embodiment

By way of illustration, but not of limitation, the adjustable link of the present invention is shown functioning as a seat back adjuster. In FIGS. 1 and 2, a seat, such as a bucket seat for an automobile, is provided with a horizontal frame 2 having a rear cross bar 4 rigid therewith. An intermediate frame 6 comprises a bracket portion having a cross bar 8 and side members 10 pivotally mounted on the horizontal frame 2 by suitable pivot means 12. The bar 8 of frame 6 is provided with adjustable stop screws 14 to regulate its height above cross bar 4 and also has a bracket 16 rigidly secured thereto near one edge of the seat and projecting forwardly. A seat back frame 18 is pivotally mounted on the intermediate frame 6 by suitable brackets on the seat back frame and on bar 8, about pivot pins 20. A seat back adjuster link generally indicated at 22 is secured at one end to the outer end of bracket 16 and at its other end to suitable attachment means 24 fixed on the seat back frame 18. As will be obvious, when the link 22 is adjusted and held to a desired length, the seat back frame 18 is held in fixed angular position relative to intermediate frame 6 and both frames can then be pivotally swung forwardly about the pins 12 irrespective of the angular adjustment of frame 18 relative to intermediate frame 6.

The structure thus far described is generally the same as corresponding features of my prior Patent 3,271,071.

The adjustable link 22 will now be described in more detail, with particular reference to FIGS. 3, 4 and 5. The link comprises an outer tubular housing and guide member 26 having a clevis structure 28 at one end and in which also defines a securing means for friction plates, to be described later. The other end of tube 26 is provided with an annular closure 30 defining a guide for a rod 32 having an attachment end 34 adapted to be pivotally secured to the bracket 16. At its inner end the rod 34 is provided with a reduced diameter threaded portion 36 threadedly engaging in a weld nut structure 38 which in turn is provided with a flange 40 spot welded to the inner surface of a guide 42 of generally cup shape. The cup 42 encloses and secures clamping means 44 adapted to hold one end of a plurality of friction plates, to be described. It will be apparent that, when free of attachment to the bracket 16, the rod 34 may be threadedly adjusted in the nut 38 to provide a permanent length adjustment for the link 22.

Within the tubular housing 26 and between the cup 42 and closure 30, a pair of helical compression springs 46 and 48 are positioned. As will be obvious, those springs urge the cup 42 to move upwardly in the tube 26 and thus urge the link 22 to assume its shortest dimension.

A first plurality of friction plates 50 is secured to the clevis structure 28, which constitutes one portion of the adjustable link, and those plates extend toward the other portion of the link as defined by rod 32 and cup 42. A similar plurality of identical friction plates 52 is mounted in the cup 42 and extend toward the plates 50 and are interleaved therewith, as is clearly shown in FIG. 3. Each of the plates of the pluralities or groups 50 and 52 are identical to the others and are shown in more detail in FIG. 6 wherein each plate 54 is seen to comprise an elongated plate having a reversely bent end portion 56 defining a short spacer. At that end of each plate to which the spacer is attached, the opposite edges are notched as at 58 and when the plates are stacked as described, all of the notches on corresponding edges are in alignment and define transverse grooves extending across the stack of plates. Those notches are engaged by opposed ribs 60 in two halves of the clevis 28 and by opposed ribs 62 in two halves of the clamping means 44 secured within the cup 42. Thus, the reversely bent ends of each plurality or group of plates are fixedly secured to a respective portion of the adjustable link 22 and, as shown, extend in interleaved frictional engagement with the plates of the other group. The reversely bent portions 56 serve as spacers between the ends of the plates of one group so that the plates thereof extend toward the other portion in spaced parallel relation, the spacing therebetween being substantially equal to the thickness of the plates of the other group and thus all the plates are stacked in mutually frictional engagement. Obviously, the plates of the plurality 52 must move with the link portion 32 whereas the plates or plurality 50 must bear a fixed relation to the link portion 28.

As shown in FIGS. 3, 4, 7 and 8, the means for clamping or holding the plates 54 are substantially identical halves. The clevis portion 28 comprises two identical halves, one of which is shown in FIG. 7 and which are assembled in the manner shown in FIG. 4 to define a clevis having spaced ear portions 66 adapted to embrace the bracket 24. When the two halves are assembled in the manner shown in FIG. 4, their respective ribs 60 interlock with the grooves defined by notches 58 to thus lock the associated plates 54 in position. The assembled clevis 28 and plates 50 are inserted in the upper end of the tube 26 and the latter is then overturned to define a holding flange 68 and is spun or upset, at 70, into a peripheral groove 72 of the clevis whereby to lock the parts in assembled relationship. The clamping means 44 of the plurality plates 52 likewise comprises two identical halves, one of which is shown in perspective in FIG. 8 and it will be apparent that when the halves are assembled and inserted into the cup 42, they will securely grip the plurality 52 of friction plates previously referred to, by engagement of ribs 62 in notches 58. The cup 42 is likewise spun or upset into a peripheral groove 74 in the clamping means 44 and thus securely locks the assembly against separation. As will be obvious, the cup 42 is guided within the tube 26 for sliding movement toward and from the link portion defined by clevis 28.

Referring now particularly to FIGS. 3 and 5, the tube 26 is provided with opposed openings 76 and 78 adjacent the lower end of the group 50 of friction plates. A clamping structure comprises a bracket having spaced legs 80 extending from the opening 78 through the opening 76 on opposite sides of the stack of plates 54. Outwardly of the opening 78, the bracket is provided with an enlarged cross member 82 of a dimension too great to pass through the opening 78 and that cross member is provided with a threaded socket 84 in which a threaded abutment 86 is adjustably mounted. The threaded abutment 86 is provided with a flat head portion 88 arranged to bear against the outermost plate 54 of the stack previously described.

The legs 80 extend outwardly through the opening 76 and serve as a journal supporting a rock shaft 90. Between the legs 84 a rotary cam 92 is positioned and press-fitted on the shaft 90. An outer end 94 of the shaft 90 has a lever 96 press-fitted thereon and a coil spring 98 is arranged to react against one of the legs 80 and the arm 96 to urge the cam 92 to rotate in one direction, for example, counterclockwise, as seen in FIG. 3.

As will be apparent from FIG. 3, the adjustable abutment head 88 bears against the outer surface of a friction plate 54, which is secured to the clevis 28 and since both the tube 26 and the threaded socket 84 are relatively fixed to the clevis 28, there is never any frictional or sliding movement between abutment head 88 and the plate 44 which it engages. On the other hand, the friction plate 54 against which the cam surface 100 of cam 92 bears is fixed to the cup 42 and thus the plate 54 bearing against the cam moves relative to the cam axis when the link is adjusted. The spring 98 is so designed and of such strength that it will rotate the cam 92 counterclockwise, as seen in FIG. 3, sufficiently to apply pressure across the stack of plates 54 and against the abutment head 88 sufficient to hold the link against shortening under the influence of compression springs 46 and 48. It is to be noted that the head 88 distributes friction pressure over a substantial area of the plates 54 and thus avoids highly concentrated areas of frictional engagement. The purpose of the adjustment screw is to compensate for production tolerances which may change the total thickness of the stack of friction plates.

When the link 22 is extended to a length greater than its minimum length, a sufficiently high force applied thereto tending to shorten the same will cause the plate 54 bearing against cam 92 to frictionally "roll" the cam 92 in a clockwise direction, as seen in FIG. 3, thus relieving the stack of plates of the pressure provided by spring 98 and permitting forcible shortening of the link under controllable frictional resistance. However, any forces tending to lengthen the link will cause the cam 92 to frictionally roll in a counterclockwise direction and the cam surface 100 is so configured that rotation in such direction increases the pressure applied to the stack of friction plates and thus resists any effort to forcibly lengthen the link.

In the particular environment shown in FIGS. 1 and 2, the features just described are highly desirable since the seat back cannot be forcibly pushed backward but by the exertion of sufficient forward pull it can be moved forwardly without releasing the link.

It is contemplated that a suitable cable or cord 102 be connected to the outer end of arm 96 and led to a suitable accessible position whereby it can be manually and selectively actuated to release the cam 92 from contact with the plates 54 and thus completely release the stack of plates for free and easy adjustments. Upon releasing the cord 102, the spring 98 then returns the cam to pressure applying relation to the stack of friction plates.

While a single specific embodiment of the invention has been shown and described herein, it is to be understood that the same is merely illustrative of the inventive concept and that other embodiments may be resorted to within the scope of the appended claims.

I claim:

1. In a position adjusting device, an extensible link comprising: first and second aligned link portions; means guiding said portions for substantially rectilinear movement toward and from each other; a first plurality of friction plates fixed at one end to one of said portions and extending toward the other substantially parallel to the direction of relative movement between said portions; a second plurality of friction plates fixed at one end to the other portion and extending toward said one portion in interleaved relation to the plates of said first plurality and in frictional contact therewith to define therewith a laminar stack of plates; yieldable means urging said portions to move in one direction relative to each other; and releasable pressure means for applying transverse pressure to said stack of plates to frictionally bind the plates thereof, and thereby said portions, against relative movement.

2. An extensible link as defined in claim 1 wherein said pressure means comprises an abutment engaging the outermost plate on one side of said stack and a rotary cam bearing on the outermost plate on the other side of said stack, substantially directly opposite said abutment; spring means urging said cam to rotate in a direction to increase the pressure applied thereby to said stack; and selectively operable means for rotating said cam in the other direction to relieve said stack of binding pressure.

3. An extensible link as defined in claim 2 wherein said abutment is adjustable toward and from said stack.

4. An extensible link as defined in claim 2 wherein said cam is mounted for rotation about an axis fixed relative to one of said portions and wherein said outermost plate on which said cam bears is fixed to the other of said portions whereby said portions may be forcibly moved in only one relative direction whereupon said cam is frictionally rotated in a pressure releasing direction.

5. An extensible link as defined in claim 1 wherein one of said portions comprises a closed end portion of an elongaated tube, the other portion being telescopically slidable in said tube and projecting from the other end thereof, said stack of plates being housed within said tube.

6. An extensible link as defined in claim 1 wherein each of the plates of each of said plurality of plates comprises an elongated plate having a short end portion reversely bent to define a spacer between adjacent plates of each plurality.

7. An extensible link as defined in claim 6 wherein each of said plurality of plates is formed with a groove across the opposed edges of all the plates and spacers thereof; and opposed rib means on said link portions engaging in said grooves to secure each link portion to its respective plurality of plates.

References Cited

UNITED STATES PATENTS

| 2,579,305 | 12/1951 | Cushman | 297—361 |
| 3,046,055 | 7/1962 | Martens | 297—361 |
| 3,127,788 | 4/1964 | Martens | 74—586 |
| 3,271,071 | 9/1966 | Tabor | 297—375 |
| 3,339,975 | 9/1967 | Posh | 297—361 |
| 3,356,411 | 12/1967 | Homier et al. | 297—355 |
| 3,366,416 | 1/1968 | Tabor | 297—361 |

BOBBY R. GAY, *Primary Examiner.*

G. O. FINCH, *Assistant Examiner.*

U.S. Cl. X.R.

297—379